US005820317A

United States Patent [19]
Van Troba

[11] Patent Number: 5,820,317
[45] Date of Patent: Oct. 13, 1998

[54] APPARATUS FOR SUPPORTING A DRILL IN AN ELEVATED POSITION

[76] Inventor: Steven K. Van Troba, P O Box 1437, Palmer, Ak. 99645

[21] Appl. No.: 766,499

[22] Filed: Dec. 13, 1996

[51] Int. Cl.[6] ..................... B23B 45/14

[52] U.S. Cl. ..................... 408/136; 73/36; 408/234; 408/712

[58] Field of Search ..................... 408/136, 712, 408/110–112, 234; 173/36, 170

[56] References Cited

U.S. PATENT DOCUMENTS

| | | | |
|---|---|---|---|
| 2,571,862 | 10/1951 | Glenn | 408/136 |
| 2,879,677 | 3/1959 | Baublitz | 408/136 |
| 2,889,723 | 6/1959 | Morrell | 173/36 |
| 4,314,782 | 2/1982 | Beekenkamp | 408/712 |
| 4,736,804 | 4/1988 | Geibel | 408/136 |
| 5,137,235 | 8/1992 | Wentworth et al. | 408/129 |
| 5,295,620 | 3/1994 | Cousineau et al. | 408/136 |

FOREIGN PATENT DOCUMENTS

| | | | |
|---|---|---|---|
| 1379639 | 1/1975 | United Kingdom | 173/36 |

*Primary Examiner*—Steven C. Bishop
*Attorney, Agent, or Firm*—Michael J. Tavella

[57] ABSTRACT

An adjustable pole support with a mounting bracket for a drill. At the base of the pole are a swivel bracket and a pivoting foot lever. An electrical outlet is mounted on the pole and is controlled by a separate switch. Thus, the drill trigger can be locked down at the top of the pole and the drill can be operated by a remote switch. The pole is set in a location and the pole height is set just below the ceiling. A worker then presses down on the foot plate while activating the drill control switch. The drill moves upward, the hole is drilled and the drill is then withdrawn by releasing the foot lever. Once the pole height is set, the pole need not be adjusted again. The worker moves the unit to the next hole location, pushes on the electrical control switch, pushes on the foot lever, and the next hole is finished.

5 Claims, 6 Drawing Sheets

APPARATUS FOR SUPPORTING A DRILL IN AN ELEVATED POSITION

This invention relates to supports that hold drills in an elevated position and particularly to supports that hold drills in an elevated position that are remotely operated.

BACKGROUND OF THE INVENTION

Drilling holes above one's head is always difficult. Not only is it awkward to hold the drill in an upright position, but often debris falls from the hole onto the drill operator. Because the user's face is close to the operation, this debris can fall into the user's eyes and mouth making the task dangerous. As difficult as drilling one hole overhead can be, modern construction techniques often call for drilling thousands of holes through ceilings for installation of various types of fixtures and other purposes. Here, fatigue becomes a factor as holding a drill above a worker's head wears down arm strength. Moreover, such operations can lead to arm and wrist injuries. Finally, the operation can lead to other injuries caused, for example, by falling off a ladder. Thus, productivity in these types of drilling operations is greatly reduced over other types of drilling operations.

Several devices have been developed to assist in drilling holes overhead. Examples of these are found in the following patents. U.S. Pat. No. 2,405,110 to Bullock teaches use of a drill mounted on a telescoping lift. Bullock teaches use of a spring loaded handle to force the drill further upwards to drill the hole. Releasing the handle retracts the drill. U.S. Pat. No. 4,442,905 to Agoston teaches a similar type lift that has an operating handle mounted very close to the drill mount. The drill in mounted on a cradle that can be lifted to any desired height. The drill is then lifted by pulling on the operating lever. U.S. Pat. No. 5,322,397 to Spear teaches a drill lift that has a platform that is ratcheted upward by an operating lever that is mounted next to the cradle. U.S. Pat. No. 5,244,048 to Moorehead, Sr., teaches a device for drilling holes under automobiles. Although this left is considerably lower that models used for ceiling work, it also uses a pivoting handle to lift the drill. Finally, U.S. Pat. No. 2,643,088 to Hornack teaches a drill mounted on a hydraulic jack. Hornack uses the jack to provide increased pressure on the drill and requires a worker to be near the drill motor to observe its progress.

All of these designs suffer from one major problem. Although they do relieve worker fatigue, they all require the worker to be near the drill motor to operate the control levers or to observe the operation. This does nothing to solve the problem of debris falling onto the worker's face because the worker is so close to the work.

SUMMARY OF THE INVENTION

The instant invention overcomes these difficulties. It uses an adjustable pole support that has a mounting bracket for a drill at the top of the pole. At the base of the pole are a swivel bracket and a pivoting foot lever. The device also has a remote electrical control for the drill motor. In this way, the drill trigger can be locked down at the top of the pole and the drill can be operated by a remote switch. Once the pole is set in the desired location, the pole height is set just below the ceiling. A worker then presses down on the foot plate while activating the remote control drill switch. The drill is moved upward, the hole is drilled and the drill is then withdrawn by releasing the foot lever. In this way, the worker remains well below the drill (often these ceilings are between 8 and 12 feet high) and is less likely to be struck by debris. Once the pole height has been set for a given ceiling, the pole need not be adjusted again for the full range of the drilling operation. The worker simply moves the entire unit to the next hole location, pushes on the electrical control switch, pushes on the foot lever and the next hole is finished. In this way, a worker can drill many holes in one hour-hour after hour-with minimal fatigue and minimal risk of injury from debris. There is no need for a worker to climb ladders or to visually inspect the drill once the unit has been set up for a drilling operation. Thus, all the problems typically associated with the standard drilling method are eliminated here.

It is an object of this invention to produce a lift for drilling holes on overhead locations that eliminates the need for a worker to hold a drill overhead.

It is another object of this invention to produce a lift for drilling holes on overhead locations that eliminates the need for a worker to be near the drill during the drilling operation.

It is yet another object of this invention to produce a lift for drilling holes on overhead locations that can be set up once and need not be adjusted for an entire drilling operation.

It is a further object of this invention to produce a lift for drilling holes on overhead locations that has a system to remotely operate the drill motor.

It is a further object of this invention to produce a lift for drilling holes on overhead locations that uses a pivoting foot lever to engage the drill into a workpiece.

DETAILED DESCRIPTION OF THE INVENTION

Figure 1:
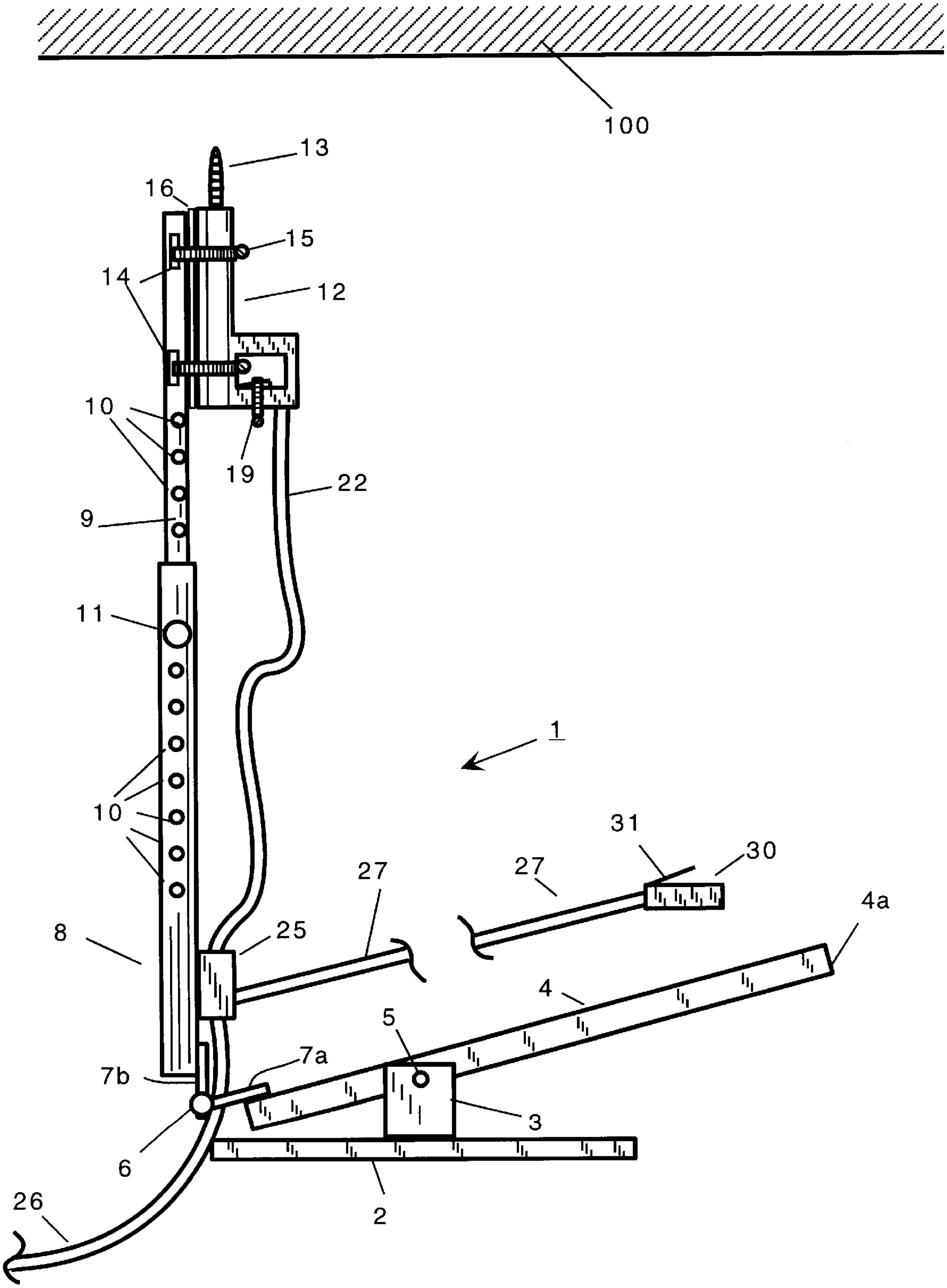
FIG. 1 is a side view of a first embodiment of the invention in the lowered position.
Figure 2:
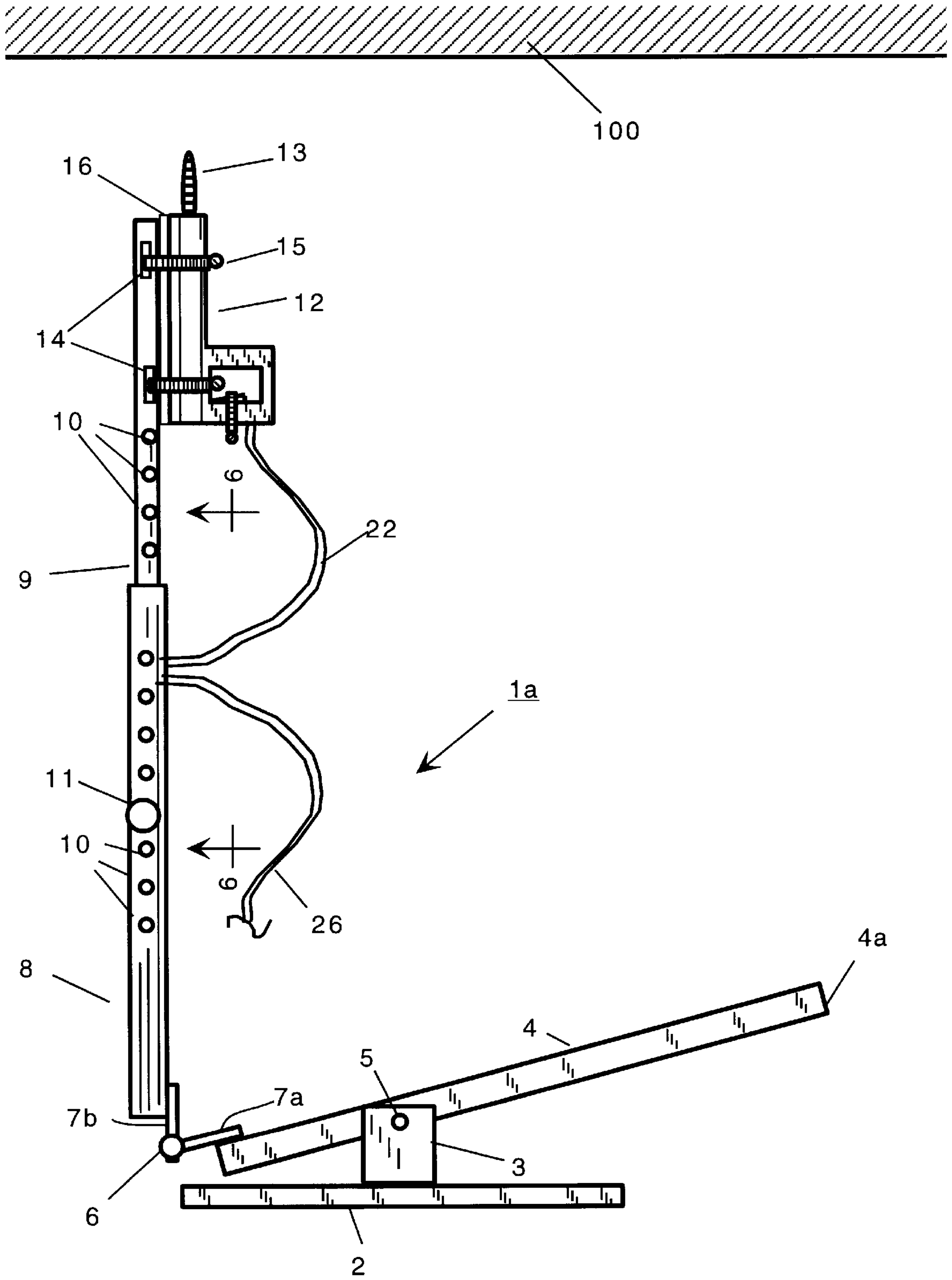
FIG. 2 is a side view of preferred embodiment of the invention in a lowered position.
Figure 3:
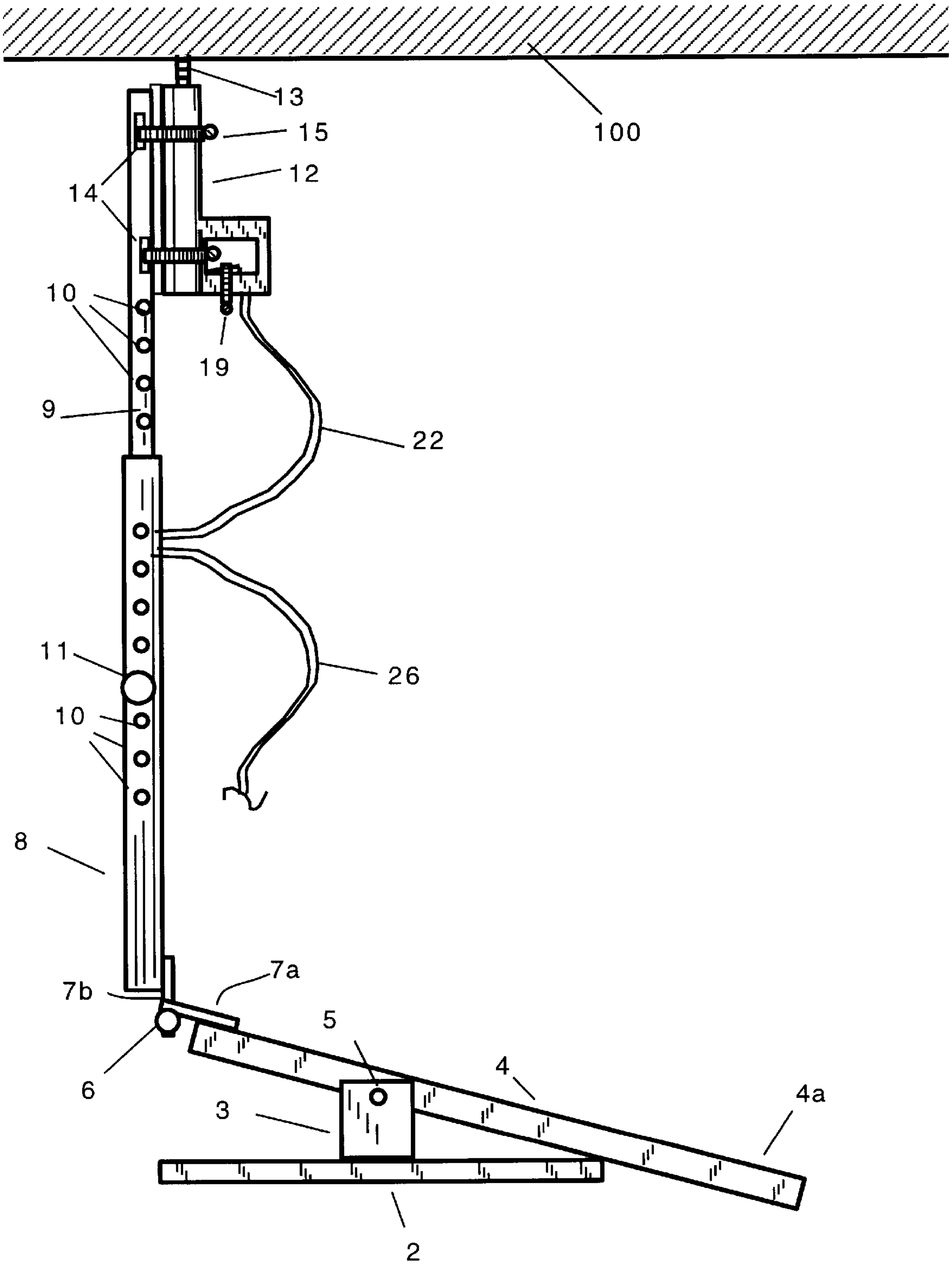
FIG. 3 is a side view of the preferred embodiment of the invention in the raised position.

Referring now to FIGS. 1, 2 and 3, two embodiments of the instant invention are shown. FIG. 1 is a view of a first, non-preferred embodiment 1 in the lower position. The difference between this embodiment and the preferred embodiment is in the remote control for the drill. This difference is discussed in detail below.

The device 1 has a base plate 2 for supporting the device 1 on a level surface. A mounting bracket 3 is attached to the base plate 2 as shown. A foot lever 4 is attached to the mounting bracket by a pivot pin 5. The pivot pin 5 permits the foot lever 4 to pivot about the pivot pin 5 within the mounting bracket 3. FIG. 3 shows the foot lever 4 of the preferred embodiment in the pivoted position. The foot lever 4 in this figure, and its structure, is identical to the first embodiment 1. A hinge 6 is attached to one end of the foot lever 4 as shown. The hinge has two flanges 7*a* and 7*b*. Flange 7*a* is attached to the foot lever 4 as shown. Flange 7*b* is attached to a riser support post 8. The riser support post 8 is a cylindrical or square tubular member. A riser arm 9 fits within the riser support post 8. The riser arm 9 is designed to fit within the riser support post 8, so that the riser support post 8 may be considered to be an outer member and the riser arm 9 may be considered to be an inner member. Both the riser support post 8 and the riser arm 9 have a number of holes 10 drilled through them as shown. In the first embodiment, two handles 11 (see FIG. 4) are used to secure the position of the riser arm 9 within the riser support post 8 at a desired operating level. For most ceiling work, this is a level at which the drill bit 13 (discussed below) is slightly below the ceiling 100.

FIG. 2 shows the preferred embodiment of the invention 1*a* in the lower position. With the exception of the controls, this embodiment is identical to the first embodiment. FIG. 3 shows the preferred embodiment 1*a* in the raised position. The operator pushes the foot lever 4 at point 4*a*. This causes the foot lever 4 to pivot about pivot pin 5, as shown. As the foot lever 4 pivots, the riser support post 8, the riser arm 9 and the drill 12 rise as well. At the top of the range of travel (as shown in FIG. 3), the drill bit 13 enters the ceiling 100. The height adjustments of the support post 8 and riser arm 9, discussed below, ensure that the drill bit 13 goes into the ceiling 100 to the proper height.

Figure 4:
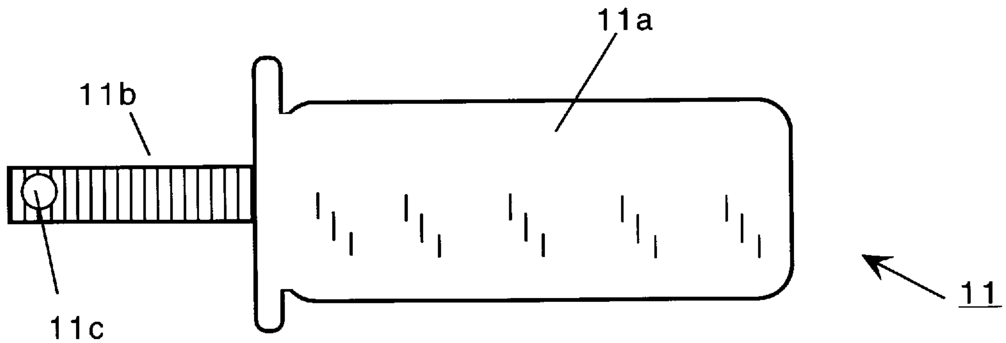
FIG. 4 is a side view of a restraining handle.
Figure 6:
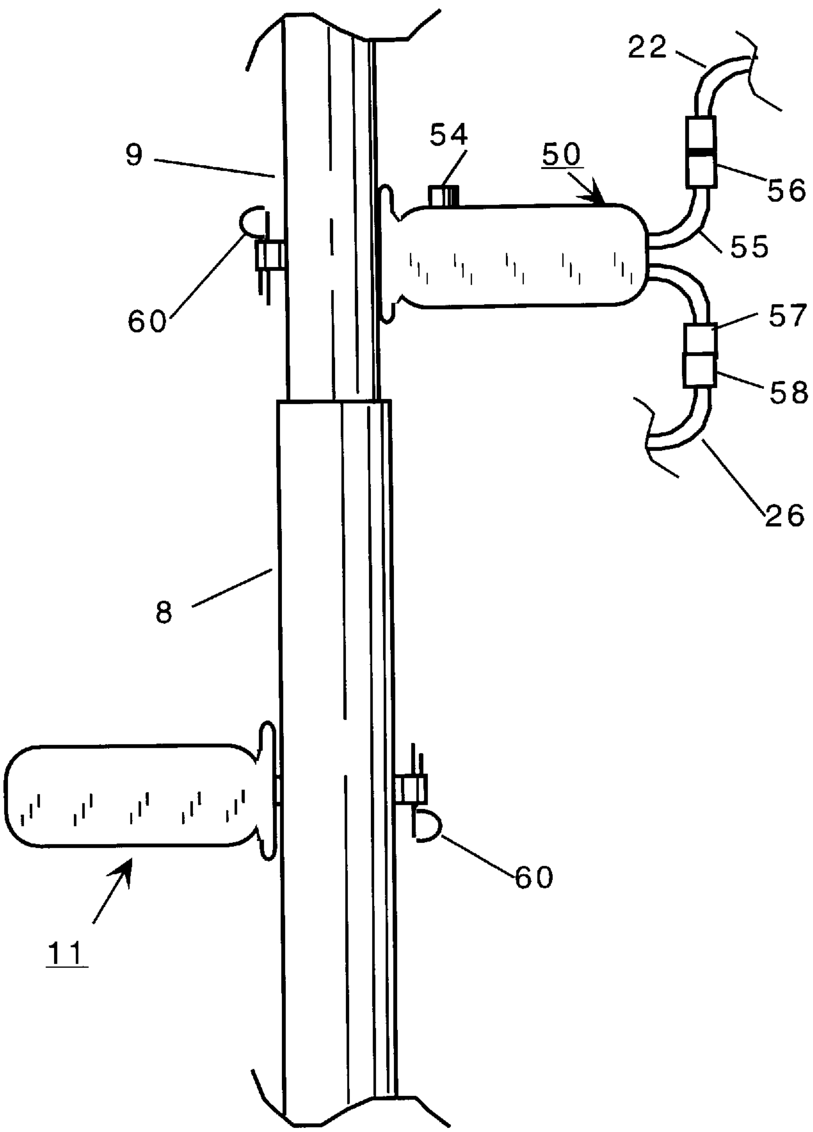
FIG. 6 is a rear detail view of the preferred embodiment taken along the lines 6—6 of FIG. 2, showing the restraining handles in place.

The handles 11 are modified drill handles that are used readily with larger size drills. The handles 11 are pushed through the holes 10 in the post 8 and in the riser arm 9. Cotter pins 60 (see FIG. 6) are used to hold the handles 11 in place. The operator can grasp the handles 11 and provide support for the device 1 during the drilling operation. As shown in FIG. 4, the handles 11 have a handle portion 11*a*, and a pin portion 11*b*. The pin portion 11*b* is pushed through the holes 10 in the riser support post 8 and the riser arm 9. The pin portion 11*b* has a hole 11*c* drilled through the end of the pin portion 11*b* as shown. The hole 11*c* is used to hold the cotter pin 60 as shown in FIG. 6.

Figure 7:
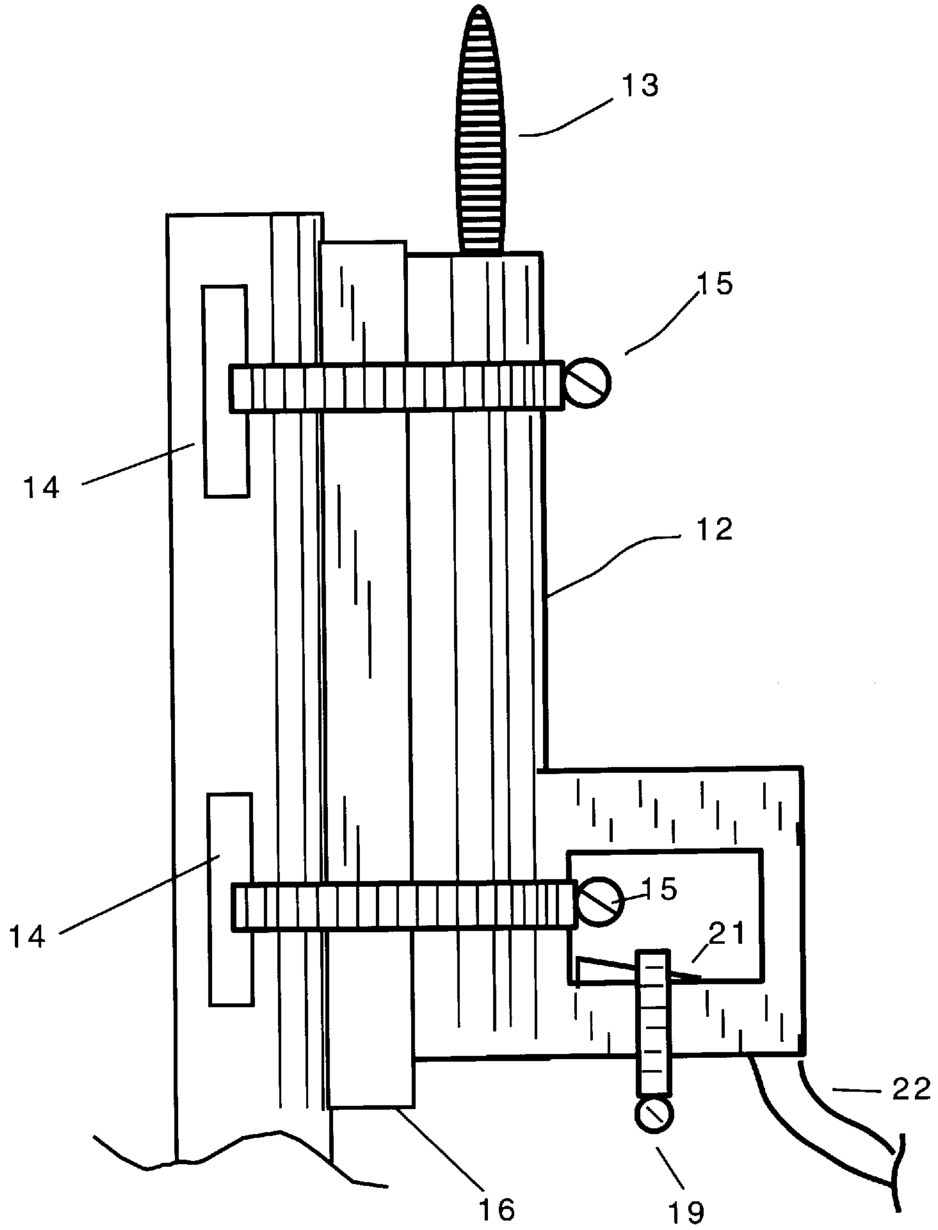
FIG. 7 is a detail view of the drill mounting bracket.

FIGS. 1,2, 3 and 7 show a drill 12 and a bit 13 attached to the riser arm 9 using a pair of drill support slots 14, formed in the riser arm 9 as shown. Two clamps 15 are used to attach the drill to the riser arm 9. FIG. 7 shows the drill support slots 14 and the clamps 15 in greater detail. A spacer plate 16 is used to hold the drill away from the riser arm 9. This spacer plate 16 is needed because of the shape of some brands of drill. The drill housing on those drills can interfere with the proper placement of the drill on the riser arm 9 if the spacer plate 16 is not in place. In practice, the spacer plate 16 is welded, or secured using similar means, to the riser arm 9. Referring now to FIG. 7, additional details of the drill support are shown. The two slots 14 that are cut into the riser arm 9 as shown, are elongated to accommodate different sizes of drills 12. The spacer plate 16 attaches to the riser arm 9, as discussed above. The pair of adjustable clamps 15 (similar to hose clamps) are passed through the slots 14 to attach the drill 12 to the riser arm 9.

FIG. 7 also shows a third clamp 19, which is designed to fit over the operating switch 21 of the drill 12. This claim 19 locks the drill 12 in the on position so that it can be remotely controlled, as discussed below.

Unlike other jacking devices, the instant invention provides two different simple control features. As just noted, the drill 12 is secured to the riser arm with its operating switch 21 in the on position. In the first embodiment, the power cord 22 for the drill 12 is connected to a switched receptacle outlet 25, that is mounted to the riser support post 8. A main power cord 26 runs from the switched receptacle outlet 25 to an outside power source (not shown). The switched receptacle outlet 25 is controlled by a remote switch 30 that is connected to the switched receptacle outlet 25 by cord 27. The switch 30 has a hand lever 31 or similar type switch that is used to operate the drill 12. The use of the remote switch 30 allows a worker to operate the device well below the level of the ceiling. The operator does not have to stand on a ladder and does not have to be immediately next to the drill. Once the device 1 is set up, the operator can stand to one side, push the remote switch 30 and step on the foot lever 4. Once a hole is drilled, the operator merely moves the assembly to the next location and drills another hole. In this manner an operator can drill holes for as long as desired. This embodiment can provide an even safer alternative in which two employees to operate the device 1. Here, the drill operator can operate the drill motor 12 by standing off to the side of the device. In this way, the operator can look up without fear of having debris fall onto the operator's face. A second operator can operate the foot switch 4, whereby this second operator does not have to look up to operate the device and is protected from debris by a hard hat or other safety equipment.

Figure 5:
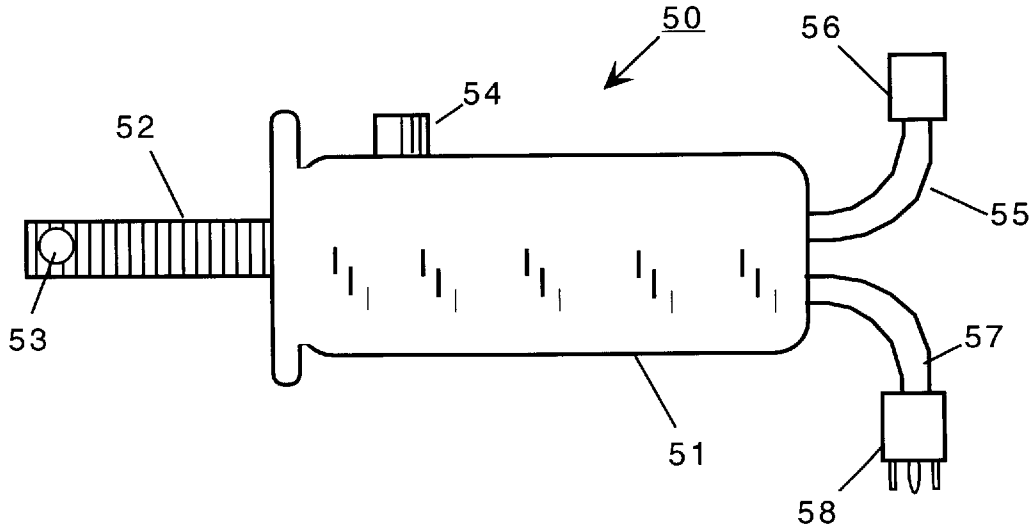
FIG. 5 is a side view of a restraining handle with remote control switch, used in the preferred embodiment.

Although this arrangement can provide a reasonable alternative, it is not preferred. Ideally, only one operator is needed for the device. Moreover, once the height setting is established the operator does not have to look up during the drilling operations. In the preferred embodiment, one of the handles 11 is a remote control switch 50. This switch 50 is shown in FIG. 5. This switch 50 has a handle portion 51 and a pin portion 52. The pin portion 52 has a hole 53 to accommodate a cotter pin 60 (see FIG. 6). Within the handle portion 51 there is a pressure type switch 54 that protrudes from the handle portion 51 as shown. A first line 55 is provided for connection to the drill cord 22. The first line 55 has a standard receptacle 56 attached as shown. A second line 57 is provided to connect to the main power cord 26. This second line 57 has a standard plug 58 attached as shown. The lines 55 and 57 are connected to the switch 54 using standard wiring techniques that are standard in the industry.

Referring now to FIG. 6, to use the control 50, the operator sets the working height of the device 1*a* and locks the height in by placing a handle 11 through one hole 10 and then sets the control handle 50 through a second hole 10. Both handles are then locked using cotter pins 60 as shown in FIG. 6. The operator then grasps the handle 11 and the control handle 50. Once the handle portion 51 of the control 50 is grasped, the pressure switch 54 is engaged and the drill 12 is started. The operator then presses on the foot lever 4 to drill a hole.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. An apparatus for supporting a drill in an elevated position comprising:

a) a base plate;

b) a foot lever, pivotably attached to said base plate;

c) a riser, including an outer member, and an inner member, and such that said inner member is contained within said outer member and extends upwardly therefrom, said outer member and said inner member also having a plurality of holes formed therein, such that said plurality of holes in said outer member aligns with said plurality of holes in said inner member, thereby forming a plurality of corresponding hole pairs;

d) a first support handle, having a handle portion and a pin portion, wherein said pin portion is placed through one hole pair in said inner and outer members of said riser;

e) a means for attaching said drill to said riser, including at least one slot formed in said riser, and a clamp for attaching said drill to said riser, through said one slot;

f) a second support handle, having a handle portion and a pin portion, wherein said pin portion is placed through a second hole pair in said inner and outer members of said riser; and g) a means for controlling said drill, in electrical communication with said drill.

2. The apparatus of claim 1 wherein the means for controlling said drill comprises an electrical receptacle, being connected to a source of electrical power; and a control switch that is in electrical communication with said electrical receptacle.

3. The apparatus of claim 1 wherein said foot lever pivots in an upward and downward motion.

4. The apparatus of claim 1 wherein when said foot lever pivots in an downward direction, said riser moves upwardly and when said foot lever pivots upwardly, said riser moves downwardly.

5. The apparatus of claim 1 wherein the means for controlling said drill comprises a switch formed in said second support handle.

* * * * *